United States Patent [19]

Akashi et al.

[11] Patent Number: 5,488,428
[45] Date of Patent: Jan. 30, 1996

[54] VIDEO SPECIAL EFFECT GENERATING APPARATUS

[75] Inventors: Tomoko Akashi, Moriguchi; Norio Suzuki, Neyagawa, both of Japan

[73] Assignee: Matsushita Electric Industrial Co., Ltd., Osaka, Japan

[21] Appl. No.: 319,007

[22] Filed: Oct. 6, 1994

[51] Int. Cl.$^6$ ................................................. H04N 5/262
[52] U.S. Cl. ........................................ 348/578; 348/575
[58] Field of Search .................................. 348/578–583, 348/575; 345/139, 138, 144; 395/126, 132, 129; H04N 5/262

[56] References Cited

U.S. PATENT DOCUMENTS 4,862,391  8/1989  Ohhashi .................................. 345/139
5,255,353  10/1993  Itoh ........................................ 345/139

FOREIGN PATENT DOCUMENTS 292975  11/1989  Japan ............................. H04N 5/262
163970  7/1991  Japan ............................. H04N 5/262
2266425  10/1993  United Kingdom ........... H04N 5/262

Primary Examiner—James J. Groody
Assistant Examiner—Glenton B. Burgess
Attorney, Agent, or Firm—Wenderoth, Lind & Ponack

[57] ABSTRACT

In apparatus for generating a video special effect of making an image to see as if it were illuminated with light and changing the qualitative appearance of the image, an input video signal is stored in a video memory and read out by a reading address generated by a reading address generator. A video signal differentiating circuit differentiates the video signal read out from the video memory to obtain a dislocation quantity. An address dislocating circuits dislocates the reading address by using the dislocation quantity to produce a dislocation address. A region extracting circuit generates a region signal showing a positional relation of a pixel specified by the dislocation address and a predetermined specific region on the basis of the dislocation address. A luminance calculating circuit calculates a luminance correction value on the basis of the region signal. A video synthesizing circuit synthesizes the luminance correction value and the video signal read out from the video memory to obtain an output video signal.

20 Claims, 8 Drawing Sheets

VIDEO SPECIAL EFFECT GENERATING APPARATUS

BACKGROUND OF THE INVENTION

1. Field of the Invention

The present invention relates to a video special effect generating apparatus for processing a video signal so as to generate various video special effects on a picture.

2. Description of the Prior Art

Hitherto, various video special effects have been developed and realized by video special effect generating apparatuses. For example, such video special effects as image expansion, image contraction, image rotation, image defocusing, color changing, and image lighting-up or illuminating (effect of making an image as if it were illuminated with light) have been often employed in television programs and commercial productions and contributing to creation of impressive pictures.

An example of a conventional apparatus for generating the image lighting-up, or illuminating, effect is disclosed in Japanese Laid-open Patent Application No. 1-292975. A feature of this apparatus lies in a reading address generator. In this reading address generator, the distance between the position of each pixel of an input image and a predetermined specific line on the image plane is determined by a distance calculator. The determined distance is sent as a distance signal to a function generator which is composed of a position function generator and a luminance function generator. The position function generator converts the distance signal so as to give a desired positional deformation, and the luminance function generator converts the distance signal so as to give a desired luminance change. In an image subjected to this processing, when, for example, a sheet of paper placed on a Hat plane in the image is rounded into a cylindrical shape, the cylinder looks as if it were illuminated with light. That is, the conventional video special effect generating apparatus can generate the image lighting-up effect.

However, the conventional video special effect generating apparatus cannot generate more sophisticated video special effects like the effect of giving a lit-up object in the image with a qualitative appearance.

SUMMARY OF THE INVENTION

It is hence a primary object of the invention to provide a video special effect generating apparatus capable of realizing the video special effect of changing the qualitative appearance of an object in a picture as well as the lighting-up, or illuminating, effect.

To achieve this object, a video special effect generating apparatus of the invention comprises a video memory for storing an input video signal, reading address generating means for generating a reading address composed of an x-direction component and a y-direction component of an x-y two-dimensional coordinate system for designating a pixel of the video signal and for reading out the video signal from the video memory by the reading address, video signal differentiating means for differentiating the video signal read out from the video memory by the reading address to generate a dislocation quantity, address dislocating means for dislocating the reading address through an operation of the reading address and the dislocation quantity to generate a-dislocation address, region extracting means for extracting a region for changing the video signal on the basis of the dislocation address and for generating a region signal indicative of a positional relation between a pixel specified by the dislocation address and the extracted region, luminance calculating means for calculating a luminance correction value of the video signal on the basis of the region signal, and video synthesizing means for synthesizing the luminance correction value and the video signal read out from the video memory to obtain an output video signal.

The video special effect generating apparatus of the invention with the above structure changes the video signal, especially the luminance component of the video signal, so as to realize not only the lighting-up effect, but also such a new video special effect as changing a qualitative appearance of an image by lighting and/or shadowing the contour of the image so that the contour looks bulgy.

DESCRIPTION OF THE PREFERRED EMBODIMENTS

Figure 1:
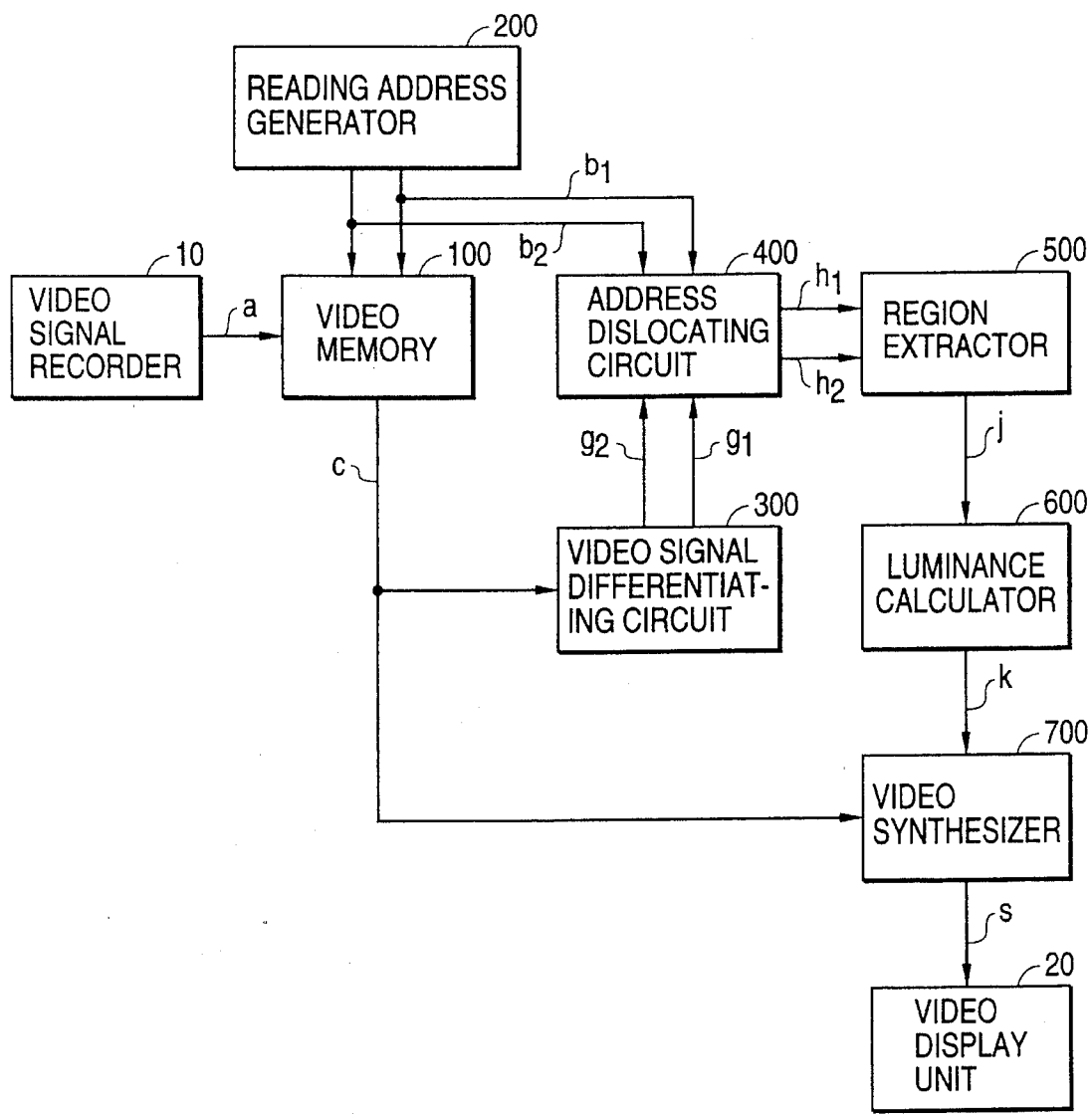
FIG. 1 is a block diagram showing a video special effect generating apparatus in an embodiment of the invention.

FIG. 1 is a schematic block diagram of a video special effect generating apparatus in an embodiment of the invention. In FIG. 1, an input video signal a, which is a digital television signal supplied from a video signal recorder 10.

Here, the input video signal a may not be limited to the signal supplied from the video signal recorder 10, but may be any other digital television signal such, for example, as a digital television signal transmitted through a wired or wireless transmission path or a digital television signal supplied from a video switcher. The input video signal a is stored in a video memory 100. The address space of the video memory 100 is defined in an x-y two-dimensional coordinate system. A reading address generator 200 generates a reading address composed of an x-direction component $b_1$ and a y-direction component $b_2$ in the x-y two-dimensional coordinate system. The reading address ($b_1$, $b_2$) is applied to the video memory 100 to read out the stored video signal from the video memory 100 as a video signal c. The video signal c is entered into a video signal differentiating circuit 300. The video signal differentiating circuit 300 differentiates the video signal c with respect to two directions in a manner described later to produce a dislocation quantity $g_1$ for dislocating the x-direction component of the reading address and a dislocation quantity $g_2$ for dislocating the y-direction component of the reading address.

The image to be displayed on a video display unit 20 (for example, a CRT) is constructed by pixels which are arranged at regular intervals in the horizontal and vertical directions. Hereinafter, the horizontal direction will be referred to as H direction and the vertical direction will be referred to as V direction. Each row of pixels arranged in the H direction is called a line. The video signal differentiating circuit 300 performs differentiation of the video signal c with respect to the H direction and the V direction. In a preferred example of the differentiation calculation for determining a differential value of the video signal at a certain pixel $Q_{22}$ with respect to each of the H direction and V direction, a difference between a value of a previous pixel which is one pixel before the pixel $Q_{22}$ and a value of a next pixel which is one pixel after the pixel $Q_{22}$ is calculated. A constitution example of the video signal differentiating circuit 300 in this case is shown in a block diagram in FIG. 2, and the arrangement of pixels is shown in FIG. 3. Referring to FIG. 3, the difference between the values of the pixel $Q_{21}$ and the pixel $Q_{23}$ in the direction, and the difference between the values of the pixel $Q_{12}$ and the pixel $Q_{32}$ in the V direction are calculated as differential values.

Figure 2:
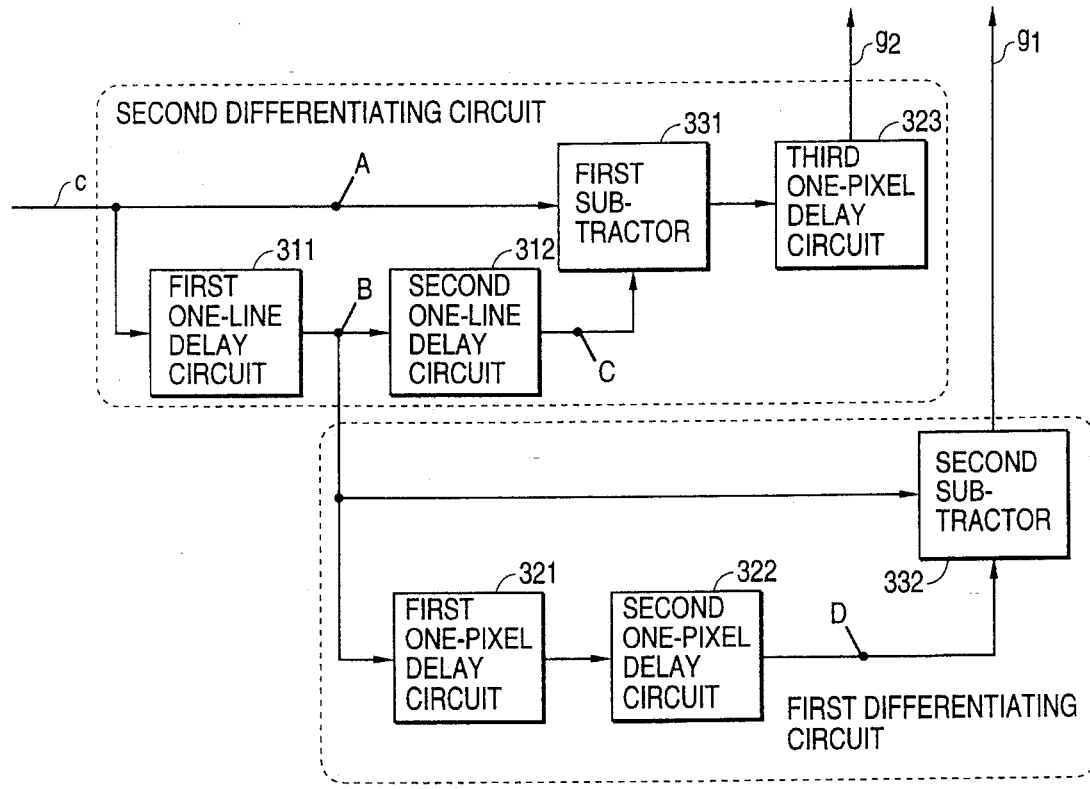
FIG. 2 is a block diagram showing a constitution example of a video signal differentiating circuit.
Figure 3:
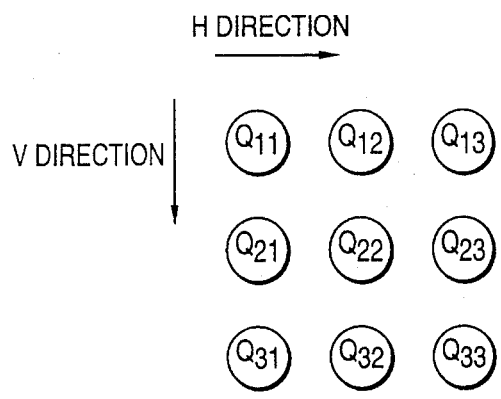
FIG. 3 is a schematic diagram showing an arrangement of pixels on an image plane.

Referring to FIG. 2, a first one-line delay circuit 311 delays the video signal c read out from the video memory 100 by one line, and a second one-line delay circuit 312 further delays the output of the first one-line delay circuit 311 by one line. That is, when the video signal sample of the pixel $Q_{33}$ is observed at point A, the video signal sample of the previous pixel $Q_{23}$ which is one line before the pixel $Q_{33}$ is observed at point B, and the video signal sample of the pixel $Q_{13}$ which is two lines before the pixel $Q_{33}$ is observed at point C. A first subtractor 331 calculates the difference between the video signal c and the output of the second one-line delay circuit 312, that is, the difference between the values of the pixel $Q_{33}$ and the pixel $Q_{13}$. A third one-pixel delay circuit 323 delays the output of the first subtractor 331 by one pixel. Therefore, the output signal of the third one-pixel delay circuit 323 is a difference between the values of the pixel $Q_{32}$ and the pixel $Q_{12}$. This calculation corresponds to the differentiation of the video signal with respect to the V direction mentioned before. The output of the third one-pixel delay circuit 323 is outputted from the video signal differentiation circuit 300 as a y-direction component $g_2$ of a dislocation quantity.

A first one-pixel delay circuit 321 delays the video signal outputted from the first one-line delay circuit 311 by one pixel, and a second one-pixel delay circuit 322 delays the output video signal of the first one-pixel delay circuit 321 further by one pixel. Therefore, when the video signal sample of the pixel $Q_{23}$ is observed at point B, the video signal sample of the pixel $Q_{21}$ which is two pixels before the pixel $Q_{23}$ is observed at point D. A second subtractor 332 calculates the difference between the output of the first one-line delay circuit 311 and the output of the second one-pixel delay circuit 322, that is, the difference between the values of the pixel $Q_{23}$ and the pixel $Q_{21}$. This calculation corresponds to the differentiation of the video signal c with respect to the H direction mentioned before. The output of the second subtractor 332 is outputted from the video signal differentiation circuit 300 as an x-direction component $g_1$ of the dislocation quantity.

Figure 4:
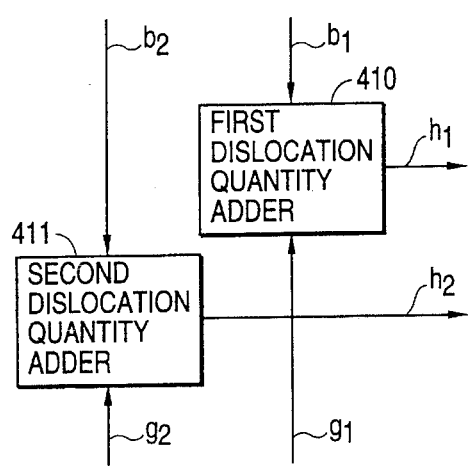
FIG. 4 is a block diagram showing a constitution example of an address dislocating circuit in the case of address dislocation by addition.

Referring back to FIG. 1, an address dislocating circuit 400 performs a predetermined operation on the reading address components $b_1$, $b_2$ and the dislocation quantity components $g_1$, $g_2$ so as to dislocate the reading address and produces a dislocation address composed of an x-direction component $h_1$ and a y-direction component $h_2$, which indicates the operation result, i.e., the dislocated reading address. A preferred example of the operation in the address dislocating circuit 400 may be an addition. FIG. 4 is a block diagram showing a constitution example of the address dislocating circuit 400 for performing the address dislocating by addition. A first dislocation quantity adder 410 adds the x-direction component $g_1$ of the dislocation quantity to the x-direction component $b_1$ of the reading address to thereby produce the x-direction component $h_1$ of the dislocation address. Similarly, a second dislocation quantity adder 411 adds the y-direction component $g_2$ of the dislocation quantity to the y-direction component $b_2$ of the reading address to thereby produce the y-direction component 112 of the dislocation address. Since the dislocation quantity components $g_1$, $g_2$ are differentiated values of the video signal as described before, it may be said that the dislocation address is determined by adding the differential value of the video signal to the reading address. Accordingly, if the video signal is constant, the differential value is 0, so that the value of the reading address is directly issued as the dislocation address. However, in the area where the video signal varies, the reading address is dislocated depending on the rate of change of the video signal, and issued as the dislocation address. Here, when differentiating the video signal, it is preferable to differentiate the luminance component in the video signal. When the luminance component is differentiated, the influence of a portion where the luminance component changes largely such, for example, as a contour portion of an image, appears obviously on the output.

Referring again to FIG. 1, a region extractor 500 produces a region signal j showing a relation between a pixel specified by the dislocation address ($h_1$, $h_2$) and a predetermined specific region (an example of the specific region will be described later). A luminance calculator 600 receives the region signal j, and calculates a luminance correction value k for correcting the luminance component of the video signal c so as to provide a desired video special effect. The luminance correction value k may be set to a constant value. However, it is rather preferable to set the luminance correction value k such that the luminance of the video signal becomes gradually higher from the periphery toward the center of the specified region. By setting the luminance correction value k in this manner, the image being illuminated can be more realistically expressed. Examples of the practical method of region extraction and the practical method of calculating the luminance correction value k will be described later. A video synthesizer 700 synthesizes the video signal c read out from the video memory 100 and the luminance correction value k to obtain an output video signal s. The video display unit 20 converts the video signal s from a digital signal form to an analog signal form, and produces an image on a display screen thereof.

Figure 5:
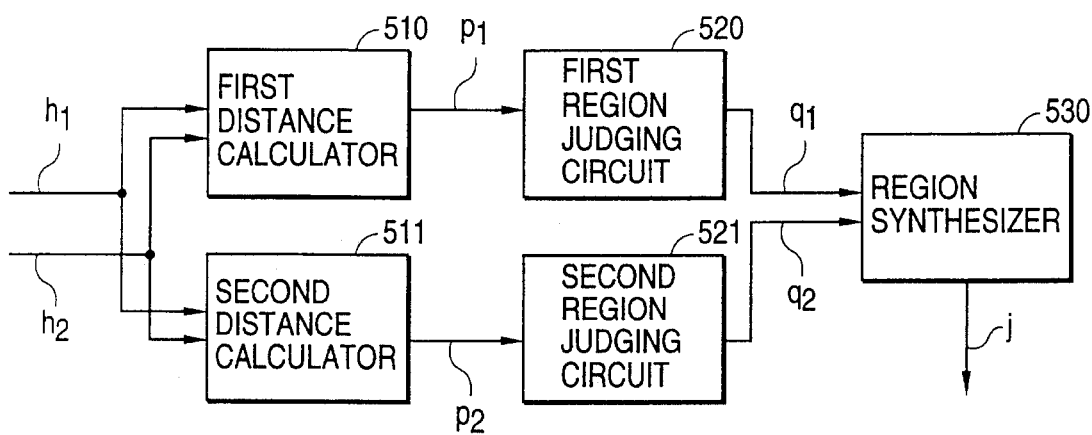
FIG. 5 is a block diagram showing a constitution example of a region extractor.
Figure 6:
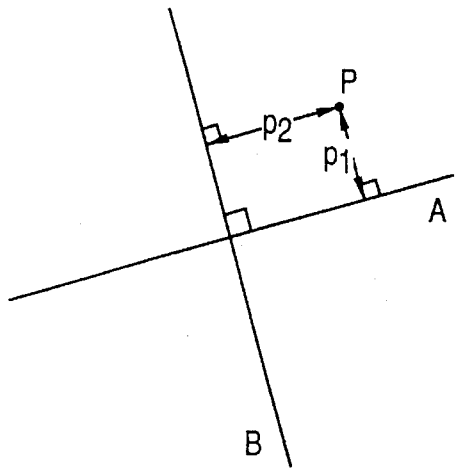
FIG. 6 is a diagram showing a relation of a pixel specified by a dislocation address, a predetermined straight line, and a distance from the pixel to the line.
Figure 7:
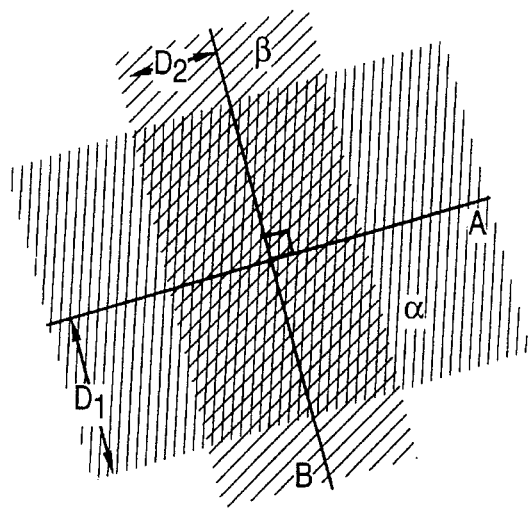
FIG. 7 is a diagram showing a relation of the predetermined straight line and a predetermined specific region.

FIG. 5 is a block diagram showing a constitution example of the region extractor 500. A first distance calculator 510 and a second distance calculator 511 respectively receive the x-direction component $h_1$ and y-direction component $h_2$ of the dislocation address outputted from the address dislocating circuit 400. The first distance calculator 510 calculates a distance $p_1$ of a pixel P specified by the dislocation address $(h_1, h_2)$ from a predetermined straight line A on the image plane and outputs the calculated distance $p_1$. A first region judging circuit 520 calculates a region signal $q_1$ showing a positional relation of the pixel P with respect to a predetermined specified region $\alpha$ on the image plane on the basis of the distance $p_1$ and outputs the calculated region signal $q_1$. Here, the specified region $\alpha 0$ may, for example, be determined as a region within a distance greater than 0 and smaller than $D_1$ from the straight line A, where $D_1$ is a positive constant. Similarly, the second distance calculator 511 calculates a distance $p_2$ of the pixel P from another predetermined straight line B on the image plane and outputs the calculated distance $p_2$. A second region judging circuit 521 calculates a region signal $q_2$ showing a positional relation of the pixel P with respect to a predetermined specified region $\beta$ on the image plane on the basis of the distance $p_2$ and outputs the calculated region signal $q_2$. Here, the specified region $\beta$ may, for example, be determined as a region within a distance greater than 0 and smaller than $D_2$ from the straight line B, where $D_2$ is a positive constant. Preferably, tile lines A and B may cross orthogonally. In this example, tile relation of the line A, line B, pixel P, distance $p_1$, and distance $p_2$ is shown in FIG. 6, and the relation of the line A, line B, region $\alpha$, and region $\beta$ is shown in FIG. 7. Preferably, the region signal $q_1$ may be a value of the distance $p_1$ normalized by $D_1$, i.e., the value obtained by dividing $p_1$ by $D_1$, and the region signal $q_2$ may be a value of the distance $p_2$ normalized by $D_2$, as shown in the following equations:

$$q_1 = p_1/D_1$$

$$q_2 = p_2/D_2$$

Therefore, when the value of the region signal $q_1$ is 1 or less, the pixel P exists in the region $\alpha$, and becomes closer to the middle of the region $\alpha$ as the value of $q_1$ becomes smaller. Similarly, when the value of the region signal $q_2$ is 1 or less, the pixel P exists in the region $\beta$, and becomes closer to the middle of the region $\beta$ as the value of $q_2$ becomes smaller. The two region signals $q_1$ and $q_2$ are synthesized by a region synthesizer 530 to obtain the region signal j.

Figure 8:
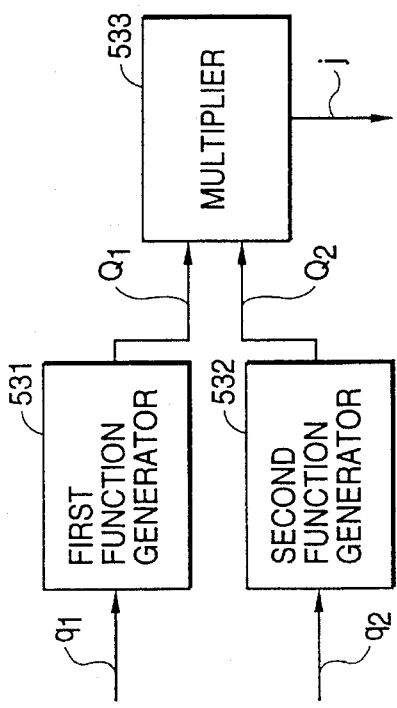
FIG. 8 is a block diagram showing a constitution example of a region synthesizer in the example of the region extractor shown in FIG. 5.

FIG. 8 is a block diagram showing a constitution example of the region synthesizer 530. A first function generator 531 converts the region signal $q_1$, by using a specific function to produce a region auxiliary signal $Q_1$. A second function generator 532 converts the region signal $q_2$ by using a specific function to produce a region auxiliary signal $Q_2$. An example of the specific function used for the region signal conversion may be the following function f(w):

If $w \leq 1$, $f(w) = (\cos(w \cdot \pi) + 1)/2$

If $w > 1$, $f(w) = 0$ where w may be $q_1$ in the first function generator 531 and $q_2$ in the second function generator 531.

A multiplier 533 multiplies the region auxiliary signals $Q_1$ and $Q_2$, and outputs the multiplication result as the region signal j. If both the first function generator 531 and second function generator 532 use the above-shown specific function f(w), the region signal j is given in the following formula:

$$j = f(q_1) \cdot (q_2)$$

Here, it is determined that the pixel P exists in a region to be made as if it were illuminated with light when the value of the region signal j is greater than 0, and is out of the region when the region signal j is 0. The shape of the region to be extracted is a pseudo ellipse with its axes formed by the line A and line B. The region signal j has its maximum value 1 at the intersection of the lines A and B, and becomes smaller as becoming away from the intersection.

Figure 9:
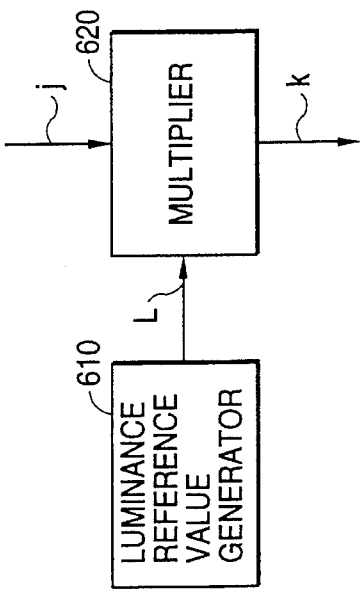
FIG. 9 is a block diagram showing a constitution example of a luminance calculator.

FIG. 9 is a block diagram showing a constitution example of the luminance calculator 600. A multiplier 620 multiplies the region signal j from the region extractor 500 by a luminance reference value L generated by a luminance reference generator 610, and outputs the multiplication result as the luminance correction value k. The luminance reference value L may, for example, be the maximum value of the luminance component of the input video signal a. When the region signal j is determined in the manner as described above, the luminance correction value k reaches the maximum value in the middle of the extracted region, and decreases as becoming away from the middle of the region until becoming 0 outside the region.

Here, as already described, the dislocation address components $h_1$, $h_2$ used for the region extraction are the reading addresses dislocated by the dislocation quantity components $g_1$, $g_2$ determined from the differential values of the video signal c. Therefore, the change of the video signal c affects also the luminance correction value k. That is, if a portion in which the video signal is flat exists adjacent to a contour portion in which the video signal changes largely in an image, the luminance correction value k takes different values in the two portions depending on the change of the video signal although the difference between the reading addresses in the two portions is small. As a result, when the luminance correction value k is determined in the manner as described above, the luminance correction value k does not uniformly decrease from the middle to the periphery of the extracted region, but the luminance correction value k increases or decreases sharply in some portions, particularly near the contour portion, due to the influence of the large change of the video signal.

An example of the synthesis carried out by the video synthesizer 700 in FIG. 1 may be an addition. When dealing with only the luminance component, in particular, the video synthesizer 700 may be an adder for adding the luminance component of the video signal c and the luminance correction value k. As described above, the luminance correction value k takes considerably different values in the contour portion in which the video signal changes largely and in the portion in which the video signal does not change (the video signal is flat). In this case, the luminance component of the output video signal s takes different values in the two portions. In other words, the luminance component at the contour portion becomes a much larger value or a much smaller value than the values at the surrounding portions. Accordingly, in the image on the display screen of the image display unit 20, the contour portion appears to be bulgy or in the shadow, or gives an impression like an oil painting.

Figure 10:
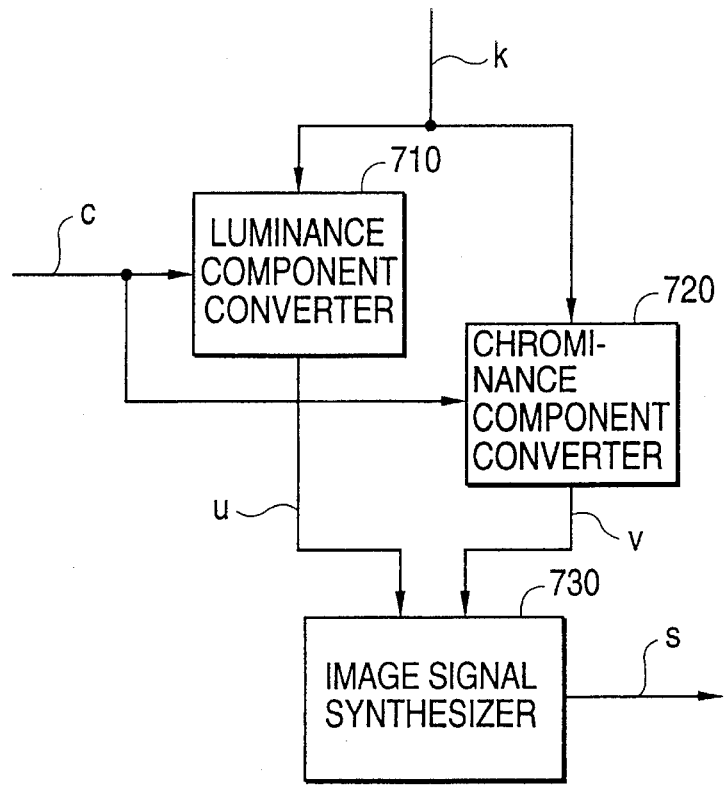
FIG. 10 is a block diagram showing a constitution example of a video synthesizer.
Figure 11:
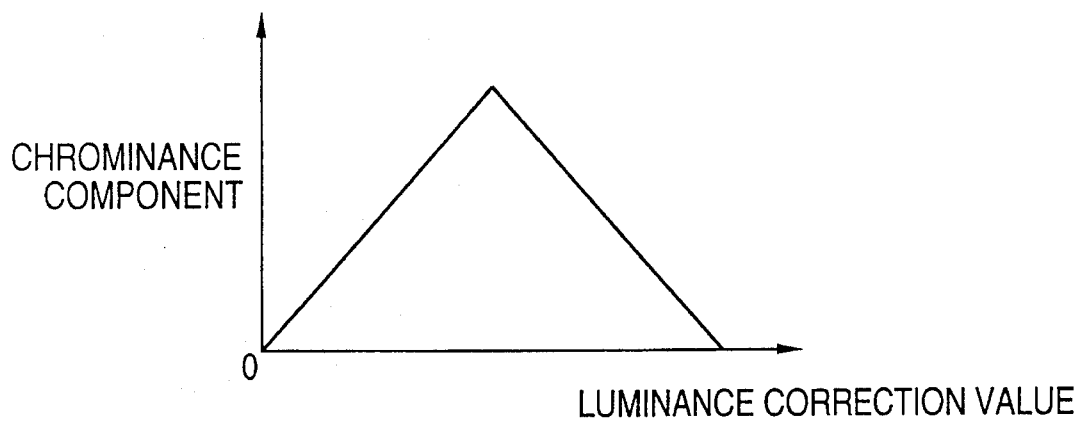
FIG. 11 is a correlation diagram of a luminance correction value and a chrominance component showing a preferred modified example in a chrominance component converter in FIG. 6.

FIG. 10 is a block diagram showing a constitution example of the video synthesizer 700 in FIG. 1. Referring to FIG. 10, each of a luminance component converter 710 and a chrominance component converter 720 receives the luminance correction value k outputted from the luminance calculator 600 and the video signal c read out from the image memory 100 by the reading address ($b_1$, $b_2$). The luminance component converter 710 produces a video signal u on the basis of the luminance correction value k. The luminance component converter 710 may comprise an adder for adding the luminance correction value k to the luminance component of the video signal c to obtain a new luminance component as the video signal u. The chrominance component converter 720 converts the chrominance component of the video signal c using a specific function with respect to the luminance correction value k to obtain a desired chrominance component as a video signal v. A preferred example of the specific function used in the chrominance component converter 720 may be a function as shown in FIG. 11 to perform such a conversion that the chrominance component takes a maximum value when the luminance correction value is a predetermined specific value, and takes a value which gradually decreases from the maximum value as the luminance correction value k becomes larger or smaller than the predetermined specific value. A video signal synthesizer 730 synthesizes the video signals u and v to obtain the output video signal s. The video signal s obtained in this manner provides such a video special effect that generates an image which is seen like a relief of a colored glass or like a stained glass.

Figure 12:
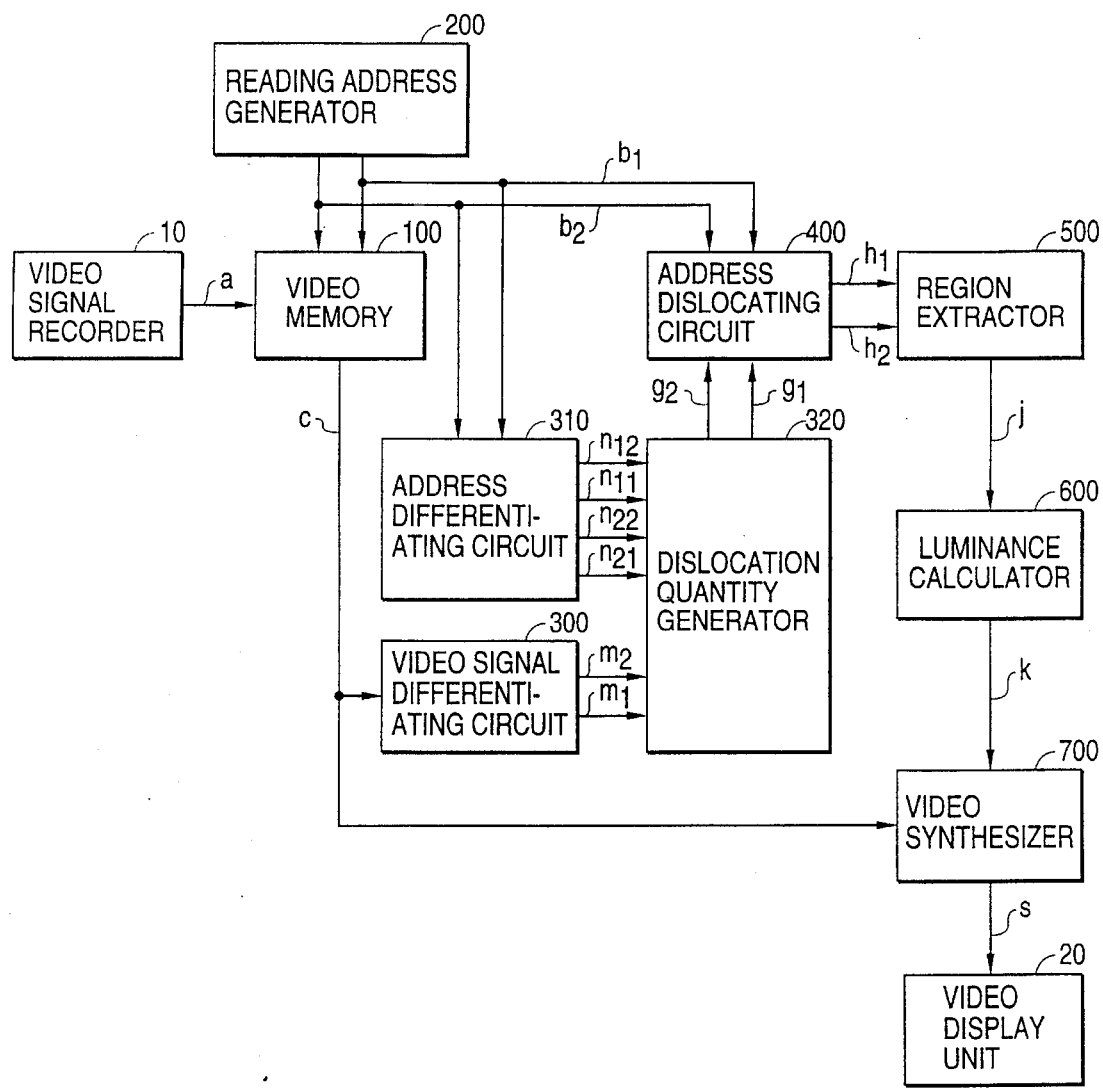
FIG. 12 is a block diagram showing a video special effect generating apparatus in another embodiment of the invention.

FIG. 12 is a schematic block diagram of a video special effect generating apparatus in another embodiment of the invention. This embodiment differs from the embodiment shown in FIG. 1 in the method of generating the dislocation quantity of address. Referring to FIG. 12, the video signal c read out from the video memory 100 by the reading address ($b_1$, $b_2$) is entered into a video signal differentiating circuit 300. The video signal differentiating circuit 300 differentiates the video signal c with respect to the H and V directions to obtain a differential value $m_1$ of the video signal c with respect to the H direction and a differential value $m_2$ of the video signal c with respect to the V direction. On the other hand, the reading address components $b_1$, $b_2$ are entered into an address differentiating circuit 310. The address differentiating circuit 310 differentiates the reading address components $b_1$, $b_2$ with respect to the H and V directions to obtain a differential value $n_{11}$ of the x-direction component $b_1$ of the reading address with respect to the H direction, a differential value $n_{12}$ of the x-direction component $b_1$ of the reading address with respect to the V direction, a differential value $n_{21}$ of the y-direction component $b_2$ of the reading address with respect to the H direction, and a differential value $n_{22}$ of the y-direction component $b_2$ of the reading address with respect to the V direction. A dislocation quantity generating circuit 320 performs a multiplication and addition operation on the differential values $m_1$, $m_2$, $n_{11}$, $n_{12}$, $n_{21}$ and $n_{22}$ as described later to produce a dislocation quantity which is composed of a x-direction component $g_1$ and a y-direction component $g_2$.

A practical method of differentiation performed in each of the video signal differentiating circuit 300 and the address differentiating circuit 310 will be described below taking, as an example, a case of differentiating a pixel $Q_{22}$ among the pixels arranged as shown in FIG. 3. Concerning the pixel $Q_{22}$, the differential value $m_1$ ($Q_{22}$) of the video signal with respect to the H direction is determined by the difference between a video signal sample $c(Q_{21})$ of the pixel $Q_{21}$ which is one pixel before the pixel $Q_{22}$ in the H direction and a video signal sample $c(Q_{23})$ of the pixel $Q_{23}$ which is one pixel after the pixel $Q_{22}$ in the H direction. The other differential values are also determined in the similar manner as expressed in the following formulas:

$$m_1(Q_{22}) = c(Q_{21}) - c(Q_{23})$$

$$m_2(Q_{22}) = c(Q_{12}) - c(Q_{32})$$

$$n_{11}(Q_{22}) = b_1(Q_{21}) - b_1(Q_{23})$$

$$n_{12}(Q_{22}) = b_1(Q_{12}) - b_1(Q_{32})$$

$$n_{21}(Q_{22}) = b_2(Q_{21}) - b_2(Q_{23})$$

$$n_{22}(Q_{22}) = b_2(Q_{12}) - b_2(Q_{32})$$

Figure 13:
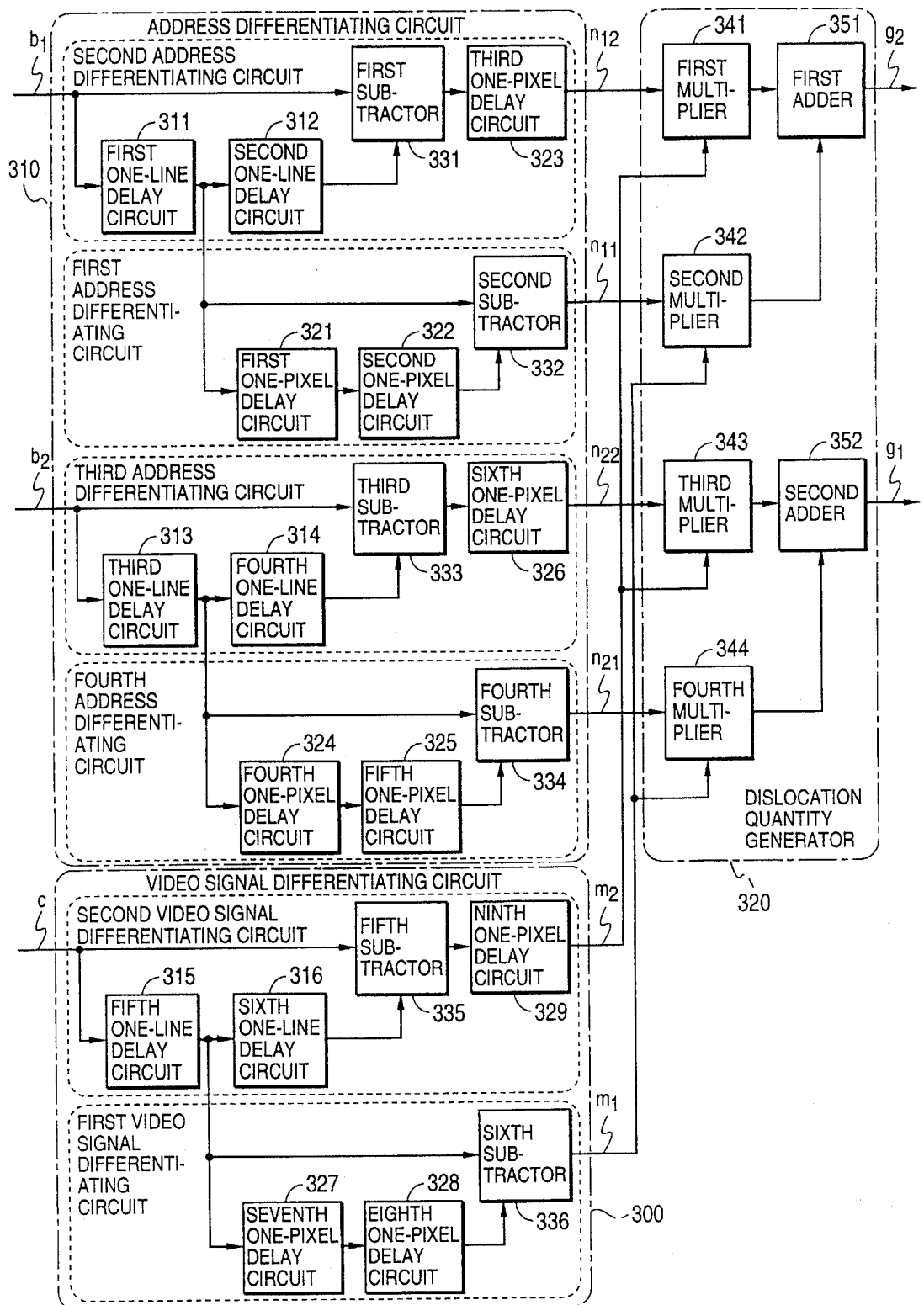
FIG. 13 is a block diagram showing a constitution example of a video signal differentiation circuit, an address differentiating circuit, and a dislocation quantity generating circuit.

This way of differentiation processing may be implemented by a constitution example of the video signal differentiating circuit 300, address differentiating circuit 310 and dislocation quantity generating circuit 320 as shown in FIG. 13.

Referring to FIG. 13, a first subtractor 331 receives the x-direction component $b_1$ of the input reading address and a component obtained by delaying the component $b_1$ by two lines by a first one-line delay circuit 311 and a second one-line delay circuit 312. That is, supposing that the input reading address corresponds to the pixel $Q_{33}$ shown in FIG. 3, the two inputs of the first subtractor 331 are the x-direction component of the reading address of the pixel $Q_{33}$ and the x-direction component of the reading address of the pixel $Q_{13}$. The first subtractor 331 calculates the difference between the values of these two components. The output of the first subtractor 331 is delayed by one pixel by a third one-pixel delay circuit 323 to obtain the differential value $n_{12}$ of the x-direction component of the reading address with respect to the V direction. Therefore, the differential value $n_{12}$ is the difference between the values of the pixels $Q_{32}$ and $Q_{12}$. On the other hand, a second subtractor 332 receives a component obtained by delaying the x-direction component $b_1$ of the input reading address by one line by the first one-line delay circuit 311 and a component obtained by delaying the output of the first one-line delay circuit 311 by two pixels by a first one-pixel delay circuit 321 and a second one-pixel delay circuit 322. That is, the two inputs of the second subtractor 332 are the x-direction component of the reading address of the pixel $Q_{23}$ and the x-direction component of the reading address of the pixel $Q_{21}$. The second subtractor 332 calculates the difference between the values of these two components to obtain the differential signal $n_{11}$ of the x-direction component of the reading address with respect to the H direction.

Similarly, the differential values of the y-direction component of the reading address can be obtained. That is, the y-direction component $b_2$ of the input reading address is delayed by two lines by a third one-line delay circuit 313 and a fourth one-line delay circuit 314. A third subtractor 333 calculates the difference between the value of the y-direction component $b_2$ of the input reading address and the value of the output of the fourth one-line delay circuit 314. The output of the third subtractor 333 is delayed by one pixel by a sixth one-pixel delay circuit 326 to obtain the differential value $n_{22}$ of the y-direction component $b_2$ of the reading address with respect to the V direction. On the other hand, the output of the third one-line delay circuit 313 is delayed by two pixels by a fourth one-pixel delay circuit 324 and a fifth one-pixel delay circuit 325. A fourth subtractor 334 calculates the difference between the values of the output of the third one-line delay circuit 313 and the output of the fifth one-pixel delay circuit 325 to obtain the differential value $n_{21}$ of the y-direction component of the reading address with respect to the H direction.

Similarly, the differential values of the video signal c can be obtained. That is, the input video signal c is delayed by two lines by a fifth one-line delay circuit 315 and a sixth one-line delay circuit 316. A fifth subtractor 335 calculates the difference between the value of the input video signal c and the value of the output of the sixth one-line delay circuit 316. The output of the fifth subtractor 335 is delayed by one pixel by a ninth one-pixel delay circuit 329 to obtain the differential value $m_2$ of the video signal c with respect to the V direction. On the other hand, the output of the fifth one-line delay Circuit 315 is delayed by two pixels by a seventh one-pixel delay circuit 327 and an eighth one-pixel delay circuit 328. A sixth subtractor 336 calculates the difference between the values of the output of the fifth one-line delay circuit 315 and the output of the eighth one-pixel delay circuit 328 to obtain the differential value $m_1$ of the video signal c with respect to the H direction.

In the dislocation quantity generating circuit 320 shown in FIG. 13, a first multiplier 341 multiplies the differential value $m_2$ and the differential value $n_{12}$. A second multiplier 342 multiplies the differential value $m_1$ and the differential value $n_{11}$. A third multiplier 343 multiplies the differential value $m_2$ and the differential value $n_{22}$. A fourth multiplier 344 multiplies the differential value $m_1$ and the differential value $n_{21}$. A first adder 351 adds the output of the first multiplier 341 and the output of the second multiplier 342 to obtain the x-direction component $g_1$ of the dislocation quantity. A second adder 352 adds the output of the third multiplier 343 and the output of the fourth multiplier 344 to obtain the y-direction component $g_2$ of the dislocation quantity. This multiplication and addition operation can be expressed in the following formulas:

$$g_1 = m_1 \cdot n_{11} + m_2 \cdot n_{12}$$

$$g_2 = m_1 \cdot n_{21} + m_2 \cdot n_{22}$$

In this way, the dislocation quantity is obtained by correcting the differential value of the video signal by the differential value of the reading address. By using the thus obtained dislocation quantity, it is possible to avoid such an unnatural phenomenon as the inconsistency of the light direction and shadow direction, which may occur when the lighting-up effect is applied to an image rotated in advance.

In the embodiment shown in FIG. 12, the operation after the stage of the address dislocation circuit 400 is the same as the operation in the embodiment shown in FIG. 1.

Figure 14:
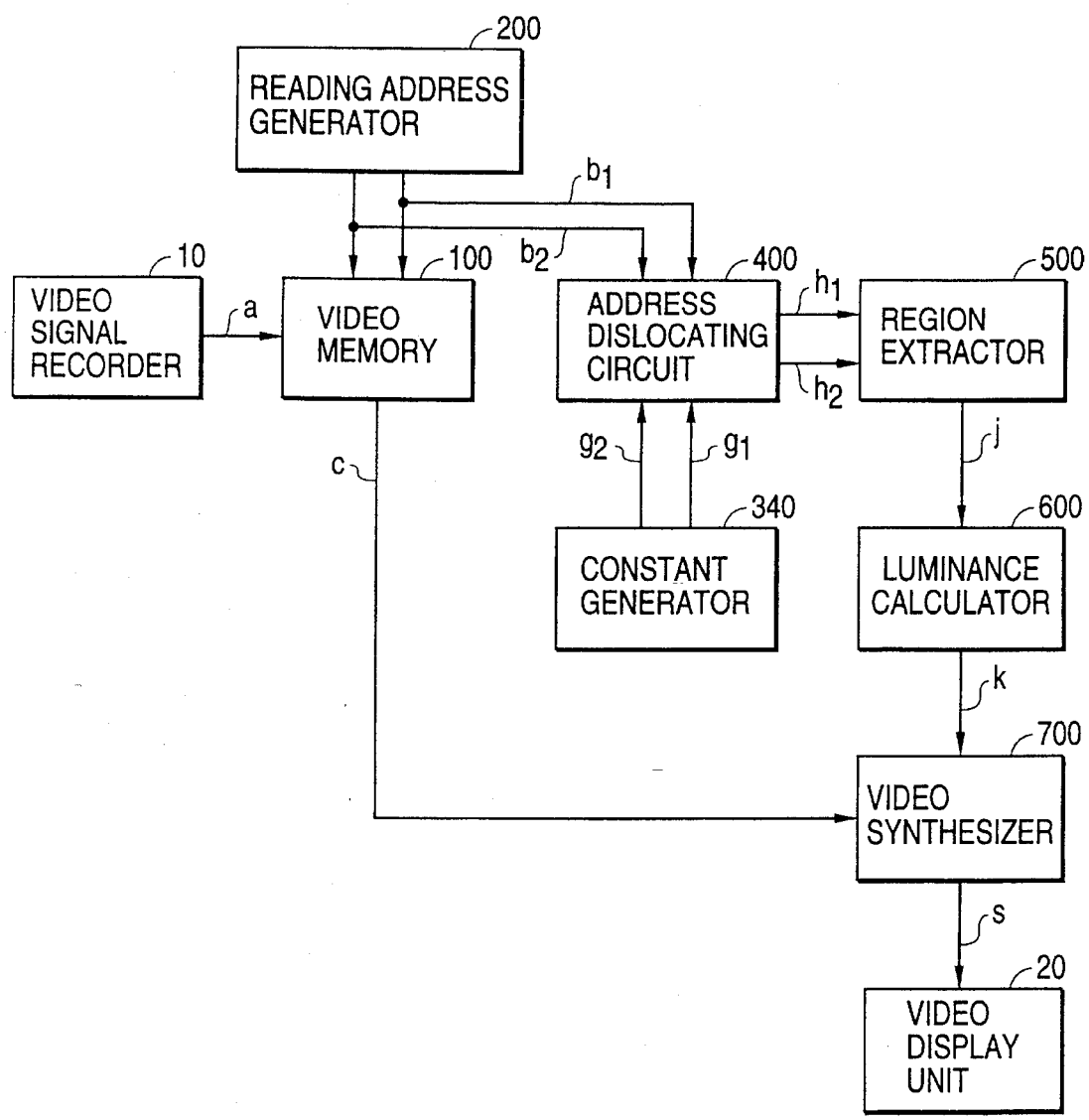
FIG. 14 is a block diagram showing a video special effect generating apparatus in still another embodiment of the invention.

FIG. 14 is a schematic block diagram of a video special effect generating apparatus in still another embodiment of the invention. Referring to FIG. 14, an input video signal a supplied from a video signal recorder 10 is stored in a video memory 100. A reading address generator 200 generates reading address components $b_1$, $b_2$. A constant generator 340 generates constants $g_1$ and $g_2$ as the x-direction component and y-direction component of the dislocation quantity. The constant $g_1$ may be set to any value selected from at least all possible values of the H direction component of an address in an address space on the display screen of the video display unit 20. Similarly, the constant $g_2$ may be set to any value selected from at least all possible values of the V direction component of the address in the address space on the display screen of the video display unit 20. The operation after the stage of the address dislocation circuit 400 in this embodiment is the same as the operation in the embodiment shown in FIG. 1. In the embodiment shown in FIG. 14, differently from the embodiments shown in FIG. 1 and FIG. 9, the dislocation quantity does not depend on the video signal. For example, in the case that the address dislocation circuit 400 employs the dislocation method of adding the dislocation quantity to the reading address, the dislocation addresses used in the region extraction are addresses shifted in parallel from the reading addresses by the dislocation quantity which is a constant value. Accordingly, on the display screen of the video display unit 20, the area being illuminated is a predetermined fixed area and does not depend on the change of the video signal. This area is seen as if a flat image plane is illuminated with light and becomes bright.

Figure 15:
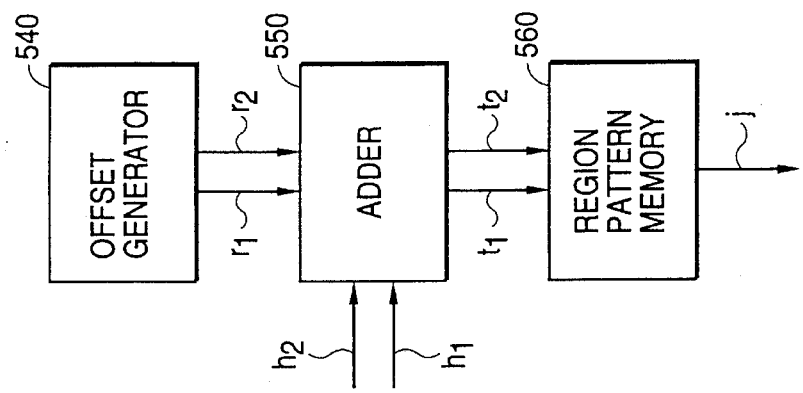
FIG. 15 is a block diagram showing a constitution example of a region extractor shown in FIG. 14.

FIG. 15 is a block diagram showing a constitution example of the region extractor 500 used in the embodiment shown in FIG. 14. Referring to FIG. 15, an offset generator 540 produces constants $r_1$ and $r_2$ which are respectively an x-direction component and a y-direction component of an offset. An adder 550 adds the offset components $r_1$ and $r_2$ respectively to the dislocation address components $h_1$ and $h_2$ outputted from the address dislocation circuit 400 to produce new address components $t_1$ and $t_2$. A region pattern memory 560 has preliminary stored therein a region to be illuminated on an image in the form of values of a region signal corresponding to individual pixels. This region signal is read out as a region signal j from the region pattern memory 560 by the address composed of the address components $t_1$, $t_2$. In this arrangement, it is possible to eliminate the calculation for the region extraction, which is complicated and takes time, by storing preliminary calculated region pattern in the region pattern memory 560. Accordingly, the region extraction can be performed in real time by merely reading out the region signal stored in the region pattern memory 560.

What is claimed is:

1. A video special effect generating apparatus for processing an input video signal to generate a video special effect, comprising:

a video memory for storing therein the input video signal, reading address generating means for generating a reading address composed of an x-direction component and a y-direction component for specifying a pixel of the input video signal, and for feeding the reading address to the video memory to read out a video signal from the video memory;

video signal differentiating means for calculating a differential value of the video signal read out from the video memory, and for outputting the differential value as a dislocation quantity;

address dislocating means for dislocating the reading address by an operation of the reading address and the dislocation quantity to produce a dislocation address;

region extracting means for generating a region signal showing a positional relation of a pixel specified by the dislocation address and a predetermined specific region on the basis of the dislocation address produced by the address dislocating means;

luminance calculating means for calculating a luminance correction value for correcting a luminance component of the video signal on the basis of the region signal; and video synthesizing means for synthesizing the luminance correction value and the video signal read out from the video memory to obtain an output video signal.

2. An apparatus according to claim 1, wherein the video signal differentiating means comprises:

first differentiating means for differentiating the video signal read out from the video memory with respect to a horizontal direction on an image plane to obtain an x-direction component of the dislocation quantity; and second differentiating means for differentiating the video signal read out from the video memory with respect to a vertical direction on the image plane to obtain a y-direction component of the dislocation quantity.

3. An apparatus according to claim 2, wherein the address dislocating means comprises:

first dislocation quantity adding means for adding the x-direction component of the dislocation quantity outputted from the first differentiating means to the x-direction component of the reading address outputted from the reading address generating means; and second dislocation quantity adding means for adding the y-direction component of the dislocation quantity outputted from the second differentiating means to the y-direction component of the reading address outputted from the reading address generating means.

4. An apparatus according to claim 1, wherein the region extracting means comprises:

first distance calculating means for calculating a first distance of the pixel specified by the dislocation address from a first specific straight line;

first region judging means for generating a first region signal showing a positional relation of the pixel specified by the dislocation address and a first specific region on the basis of the first distance;

second distance calculating means for calculating a second distance of the pixel specified by the dislocation address from a second specific straight line;

second region judging means for generating a second region signal showing a positional relation of the pixel specified by the dislocation address and a second specific region on the basis of the second distance; and region synthesizing means for synthesizing the first region signal and the second region signal to obtain the region signal to be outputted from the region extracting means.

5. An apparatus according to claim 4, wherein the region synthesizing means comprises:

first function generating means for converting the first region signal by using a first specific function to produce a first auxiliary region signal;

second function generating means for converting the second region signal by using a second specific function to produce a second auxiliary region signal; and a multiplier for multiplying the first auxiliary region signal and the second auxiliary region signal to obtain the region signal to be outputted from the region extracting means.

6. An apparatus according to claim 1, wherein the luminance calculating means comprises:

a luminance reference value generator for generating a luminance reference value; and a multiplier for multiplying the region signal outputted from the region extracting means by the luminance reference value to thereby generate the luminance correction value.

7. An apparatus according to claim 1, wherein the video synthesizing means comprises:

luminance component converting means for converting the luminance component of the video signal read out from the video memory by an operation of the luminance correction value and the luminance component to obtain a luminance converted video signal;

chrominance component converting means for converting a chrominance component of the video signal read out from the video memory by using a specific function with respect to the luminance correction value to obtain a chrominance converted video signal;

video signal synthesizing means for synthesizing the luminance converted video signal and the chrominance converted video signal to obtain the output video signal.

8. A video special effect generating apparatus for processing an input video signal to generate a video special effect, comprising:

video memory for storing therein the input video signal;

reading address generating means for generating a reading address composed of an x-direction component and a y-direction component for specifying a pixel of the input video signal, and for feeding the reading address to the video memory to read out a video signal from the video memory;

video signal differentiating means for differentiating the video signal read out from the video memory to produce a video signal differential value;

address differentiating means for differentiating the reading address to produce an address differential value;

dislocating quantity generating means for generating a dislocation quantity on the basis of the video signal differential value and the address differential value;

address dislocating means for dislocating the reading address by an operation of the reading address and the dislocation quantity to produce a dislocation address;

region extracting means for generating a region signal showing a positional relation of a pixel specified by the dislocation address and a predetermined specific region on the basis of the dislocation address;

luminance calculating means for calculating a luminance correction value for correcting a luminance component of the video signal on the basis of the region signal; and video synthesizing means for synthesizing the luminance correction value and the video signal read out from the video memory to obtain an output video signal.

9. An apparatus according to claim 8, wherein the video signal differentiating means comprises:

first video signal differentiating means for differentiating the luminance component of the video signal read out from the video memory with respect to a horizontal direction on an image plane; and second video signal differentiating means for differentiating the luminance component with respect to a vertical direction on the image plane, wherein the address differentiating means comprises:

first address differentiating means for differentiating the x-direction component of the reading address generated by the reading address generating means with respect to the horizontal direction on the image plane;

second address differentiating means for differentiating the x-direction component of the reading address with respect to the vertical direction on the image plane;

third address differentiating means for differentiating the y-direction component of the reading address with respect to the horizontal direction on the image plane; and fourth address differentiating means for differentiating the y-direction component of the reading address with respect to the vertical direction on the image plane, and wherein the dislocation quantity generating means comprises:

first multiplying means for multiplying an output of the first video signal differentiating means and an output of the first address differentiating means;

second multiplying means for multiplying an output of the second video signal differentiating means and an output of the second address differentiating means;

third multiplying means for multiplying the output of the first video signal differentiating means and an output of the third address differentiating means;

fourth multiplying means for multiplying the output of the second video signal differentiating means and an output of the fourth address differentiating means;

first adding means for adding an output of the first multiplying means and an output of the second multiplying means to obtain an x-direction component of the dislocation quantity; and second adding means for adding an output of the third multiplying means and an output of the fourth multiplying means to obtain a y-direction component of the dislocation quantity.

10. An apparatus according to claim 9, wherein the address dislocating means comprises:

first dislocation quantity adding means for adding the x-direction component of the dislocation quantity to the x-direction component of the reading address; and second dislocation quantity adding means for adding the y-direction component of the dislocation quantity to the y-direction component of the reading address.

11. An apparatus according to claim 8, wherein the region extracting means comprises:

first distance calculating means for calculating a first distance of, the pixel specified by the dislocation address from a first specific straight line;

first region judging means for generating a first region signal showing a positional relation of tile pixel specified by the dislocation address and a first specific region on tile basis of the first distance;

second distance calculating means for calculating a second distance of the pixel specified by the dislocation address from a second specific straight line;

second region judging means for generating a second region signal showing a positional relation of the pixel specified by the dislocation address and a second specific region on the basis of the second distance; and region synthesizing means for synthesizing the first region signal and the second region signal to obtain the region signal to be outputted from the region extracting means.

12. An apparatus according to claim 11, wherein the region synthesizing means comprises:

first function generating means for converting the first region signal by using a first specific function to generate a first auxiliary region signal;

second function generating means for converting the second region signal by using a second specific function to generate a second auxiliary region signal; and a multiplier for multiplying tile first auxiliary region signal and the second auxiliary region signal to obtain the region signal to be outputted from the region extracting means.

13. An apparatus according to claim 8, wherein the luminance calculating means comprises:

a luminance reference value generator for generating a luminance reference value; and a multiplier for multiplying the region signal outputted from the region extracting means by the luminance reference value to thereby obtain the luminance correction value.

14. An apparatus according to claim 8, wherein the video synthesizing means comprises:

luminance component converting means for converting the luminance component of the video signal read out from the video memory by an operation of the luminance correction value and the luminance component to obtain a luminance converted video signal;

chrominance component converting means for converting a chrominance component of the video signal read out from the video memory by using a specific function with respect to the luminance correction value to obtain a chrominance converted video signal;

video signal synthesizing means for synthesizing the luminance converted video signal and the chrominance converted video signal to obtain the output video signal.

15. A video special effect generating apparatus for processing an input video signal to generate a video special effect, comprising:

a video memory for storing therein the input video signal;

reading address generating means for generating a reading address composed of an x-direction component and a y-direction component for specifying a pixel of the input video signal, and for feeding the reading address to the video memory to read out a video signal from the video memory;

constant generating means for generating constants as an x-direction component and a y-direction component of a dislocation quantity;

address dislocating means for dislocating the reading address by an operation of the reading address and the dislocation quantity to produce a dislocation address;

region extracting means for generating a region signal showing a positional relation of the pixel specified by the dislocation address and a predetermined specific region on the basis of the dislocation address;

luminance calculating means for calculating a luminance correction value for correcting a luminance component of the video signal on the basis of the region signal; and video synthesizing means for synthesizing the luminance correction value and the video signal to obtain an output video signal.

16. An apparatus according to claim 15, wherein the address dislocating means comprises:

first dislocation quantity adding means for adding the x-direction component of the dislocation quantity generated by the constant generating means to the x-direction component of the reading address; and second dislocation quantity adding means for adding the y-direction component of the dislocation quantity generated by the constant generating means to the y-direction component of the reading address.

17. An apparatus according to claim 15, wherein the region extracting means comprises:

first distance calculating means for calculating a first distance of the pixel specified by the dislocation address from a first specific straight line;

first region judging means for generating a first region signal showing a positional relation of the pixel specified by the dislocation address and a first specific region on the basis of the first distance;

second distance calculating means for calculating a second distance of the pixel specified by the dislocation address from a second specific straight line;

second region judging means for generating a second region signal showing a positional relation of the pixel specified by the dislocation address and a second specific region on the basis of the second distance; and region synthesizing means for synthesizing the first region signal and the second region signal to obtain the region signal to be outputted from the region extracting means.

18. An apparatus of claim 17, wherein the region synthesizing means comprises:

first function generating means for converting the first region signal by using a first specific function to generate a first auxiliary region signal;

second function generating means for converting the second region signal by using a second specific function to generate a second auxiliary region signal; and a multiplier for multiplying the first auxiliary region signal and the second auxiliary region signal to obtain the region signal to be outputted from the region extracting means.

19. An apparatus according to claim 15, wherein the region extracting means comprises:

offset generating means for generating an offset which is a constant composed of an x-direction component and a y-direction component;

adding means for adding the offset to the dislocation address to obtain an offset-added address composed of an x-direction component and a y-direction component; and a region pattern memory having stored therein a predetermined region signal corresponding to a pixel specified by an address composed of an x-direction component and a y-direction component and receiving the offset-added address for reading out the predetermined region signal stored therein.

20. An apparatus according to claim 15, wherein the luminance calculating means comprises:

a luminance reference value generator for generating a luminance reference value; and a multiplier for multiplying the region signal outputted from the region extracting means by the luminance reference value to thereby generate the luminance correction value.

\* \* \* \* \*